United States Patent
Kern

[19]

[11] Patent Number: 6,124,011
[45] Date of Patent: Sep. 26, 2000

[54] INFORMATION-BEARING DISCS AND METHODS OF FABRICATION

[75] Inventor: Ellis E. Kern, Waverly, Pa.

[73] Assignee: WEA Manufacturing, Inc., Olyphant, Pa.

[21] Appl. No.: 09/146,861

[22] Filed: Sep. 3, 1998

[51] Int. Cl.[7] .................................................. B32B 3/00
[52] U.S. Cl. ...................... 428/64.1; 428/64.4; 428/65.2; 428/457; 428/913; 430/270.11; 430/495.1; 430/945; 369/283
[58] Field of Search .................................. 428/64.1, 64.2, 428/64.4, 65.2, 457, 913; 430/270.11, 495.1, 945; 369/275.1, 283, 288

[56] References Cited

U.S. PATENT DOCUMENTS

| | | | |
|---|---|---|---|
| 3,689,078 | 9/1972 | Ban .......................................... | 274/42 P |
| 4,629,668 | 12/1986 | Hamersley et al. . | |
| 4,967,286 | 10/1990 | Nomula et al. ........................... | 358/342 |
| 4,972,404 | 11/1990 | Yamaguchi et al. . | |
| 5,068,846 | 11/1991 | Kramer . | |
| 5,138,604 | 8/1992 | Umeda et al. . | |
| 5,398,231 | 3/1995 | Shin et al. ............................. | 369/275.4 |
| 5,470,627 | 11/1995 | Lee et al. . | |
| 5,726,969 | 3/1998 | Moriya et al. ......................... | 369/275.1 |
| 5,729,533 | 3/1998 | Marquardt . | |

FOREIGN PATENT DOCUMENTS

| | | | |
|---|---|---|---|
| 0 063 439 A1 | 10/1982 | European Pat. Off. .......... | G11B 7/24 |
| 0 437 223 A2 | 7/1991 | European Pat. Off. .......... | G11B 7/24 |
| 0 514 156 A2 | 11/1992 | European Pat. Off. ........ | G11B 23/40 |
| 0 517 490 A2 | 12/1992 | European Pat. Off. .......... | G11B 7/24 |
| 0 598 575 A2 | 5/1994 | European Pat. Off. .......... | G11B 7/24 |
| 0 704 843 A1 | 4/1996 | European Pat. Off. .......... | G11B 7/24 |
| 0 706 178 A2 | 4/1996 | European Pat. Off. .......... | G11B 7/26 |
| 2 710 443 | 3/1995 | France .............................. | G11B 7/08 |
| 5 054 599 | 3/1993 | Japan .............................. | G11B 23/38 |
| 8 194 972 | 7/1996 | Japan .............................. | G11B 7/24 |
| 2 203 278 | 10/1988 | United Kingdom .............. | G11B 7/24 |
| WO 95/04352 | 2/1995 | WIPO .............................. | G11B 7/00 |

OTHER PUBLICATIONS

"Video's New Look," *Popular Mechanics*, p. 32 (May 1995).

*Primary Examiner*—Elizabeth Evans
*Attorney, Agent, or Firm*—Fish & Neave

[57] ABSTRACT

Information-bearing discs are fabricated from a first disc and a second disc. The first disc has a first substantially planar surface and a second surface opposite to the first surface. The second surface has first information recorded on it by means of local changes in the distance of the second surface from the first surface. The second disc is thicker than the first disc and has opposite, substantially planar, third and fourth surfaces. The fourth surface may have second information recorded on it by means of local changes in the distance of the fourth surface from the third surface. The second disc is secured to the first disc so that the fourth surface faces the second surface.

17 Claims, 4 Drawing Sheets

INFORMATION-BEARING DISCS AND METHODS OF FABRICATION

BACKGROUND OF THE INVENTION

This invention relates to information recording media in the form of light-readable information-bearing discs, and more particularly to such media which are made up of a front-side disc and a back-side disc secured to one another back to back to form a two-sided stack.

Light-readable information recording media in the form of information-bearing discs are well known as shown, for example, by Kramer U.S. Pat. No. 5,068,846. Commercially available compact discs ("CDS") and compact disc read-only memories ("CD-ROMs") are examples of recording media of this general type.

More recently, digital versatile discs ("DVDs") have emerged wherein light-readable information technology is employed to record movies and other similar real-time audio/visual programming (hereinafter "program information") on discs. To increase program information storage capacity, information-bearing discs are formed from two discs (similar in appearance to conventional audio CDS) bonded back to back (see, for example, Marquardt, U.S. Pat. No. 5,729,533, entitled "Two-sided, Light-Readable Information Recording Disc Stacks And Methods Of Making Same," the entire contents of which are hereby incorporated by reference).

Relatively long audio/visual programs will not fit on one disc of conventional audio CD size. As such, the "back-side" (i.e., the second disc bonded to the back of the "front-side" or first disc) of a information-bearing disc may often contain "spillover" audio/visual program information (i.e., information which would not fit on the front-side of the information-bearing disc).

During the formation of a one-program-information-side information-bearing disc (for example, a information-bearing disc wherein only the front-side disc in the two disc stack contains program information), a substantially transparent plastic disc (i.e., transparent enough to allow a light beam to remain detectable following round trip travel through the plastic disc) with a substantially planar first surface (i.e., planar enough to allow a light source to differentiate topographical features disposed on a surface of the plastic disc as the disc rotates) is provided. Opposite the first surface is a second surface having program information recorded on it by means of local changes in the distance of the second surface from the first surface. A light-reflecting coating (e.g., aluminum) is then deposited (e.g., sputtered) over the second surface, the light-reflecting coating conforming to the local changes of the second surface so that light is reflected back through the disc in accordance with the program information recorded by means of the local changes.

Once the front-side program-information-bearing disc has been fabricated, one-program-information-side information-bearing disc formation is completed by bonding a back-side non-program-information-bearing disc (e.g., a disc without program information such as a blank disc or a disc with artwork, labels, or other ornamentation) to the front-side disc. This type of non-program-information-bearing disc does not normally contain a light-reflecting coating so that bonding may be performed using a light-curable bonding material which is cured by transmitting light through the back-side plastic disc. Light can not be transmitted through the front-side disc because it contains a light-reflecting coating.

When a two-program-information-sides information-bearing disc (for example, an information-bearing disc wherein both discs contain program information) is formed, a light-reflecting coating must be deposited on the back-side disc so that program information recorded thereon may be read out. A light-reflecting coating may also be required if "pit art" (see previously incorporated Marquardt U.S. Pat. No. 5,729,533, entitled "Two-sided, Light-Readable Information Recording Disc Stacks And Methods Of Making Same"), "enhanced pit art" (see, for example, Parette et al. U.S. patent application Ser. No. 08/714,302, entitled "Methods for Providing Artwork on Plastic Information Discs," filed Sep. 18, 1996, which is hereby incorporated by reference herein), or similar visible image information is contained on the back-side disc. (As used herein, the term "information," unmodified, refers to both program information and visual image information such as pit art, enhanced pit art, holographic artwork, and other labels/ornamentation.)

Regardless of whether the information-bearing disc has information on one or both sides, it is important to the light-readability (i.e., playability) of the information-bearing disc that the front-side disc and back-side disc bond together to create a suitably flat information-bearing disc. Typically, when both front-side and back-side discs are formed by the same injection molding machine, both discs fit together to create a suitably flat information-bearing disc. However, due to slight variations between molding machines, front-side and back-side discs formed on different molding machines may not bond together to create a suitably flat information-bearing disc, causing rippling and buckling (this warping is also referred to as the "potato chip" effect) which reduces the light-readability of the information-bearing disc.

A need therefore exists for a method of fabricating information-bearing discs such that the effects of variations in molding machines are minimized. Such a method will allow bonding together of front-side and back-side discs to create a substantially flat information-bearing disc with improved light-readability.

In view of the foregoing, it is an object of this invention to provide substantially flat information-bearing discs and methods of fabrication.

SUMMARY OF THE INVENTION

These and other objects of the invention are accomplished in accordance with the principles of the invention by providing a first disc and a second disc. The first disc has a first substantially planar surface and a second surface opposite to the first surface. The second surface has first information recorded on it by means of local changes in the distance of the second surface from the first surface. A second disc thicker than the first disc is provided. The second disc has opposite, substantially planar, third and fourth surfaces. The fourth surface may have second information recorded on it by means of local changes in the distance of the fourth surface from the third surface. The second disc is secured to the first disc so that the fourth surface faces the second surface.

During information-bearing disc formation, a first disc in the information-bearing disc is constructed generally as shown in Kramer U.S. Pat. No. 5,068,846 entitled "Reflective Optical Record Carrier." This first disc therefore has light-readable program information recorded on it in the known fashion (e.g., local changes in distance between a first and a second surface of the disc covered with a light-reflecting coating so that light is reflected back through the disc in accordance with the program information recorded by means of the local changes). The second disc in the information-bearing disc may similarly contain program information or some other (e.g., pit art, enhanced pit art, or holographic artwork).

Further features of the invention, its nature and various advantages will be more apparent from the accompanying drawings and the following detailed description of the preferred embodiments.

DETAILED DESCRIPTION OF THE PREFERRED EMBODIMENTS

In order to understand how the present invention improves information-bearing disc formation, it is first necessary to understand how conventional information-bearing discs are formed. With this understanding, the problems with conventional information-bearing disc fabrication techniques will be apparent.

Figure 1:
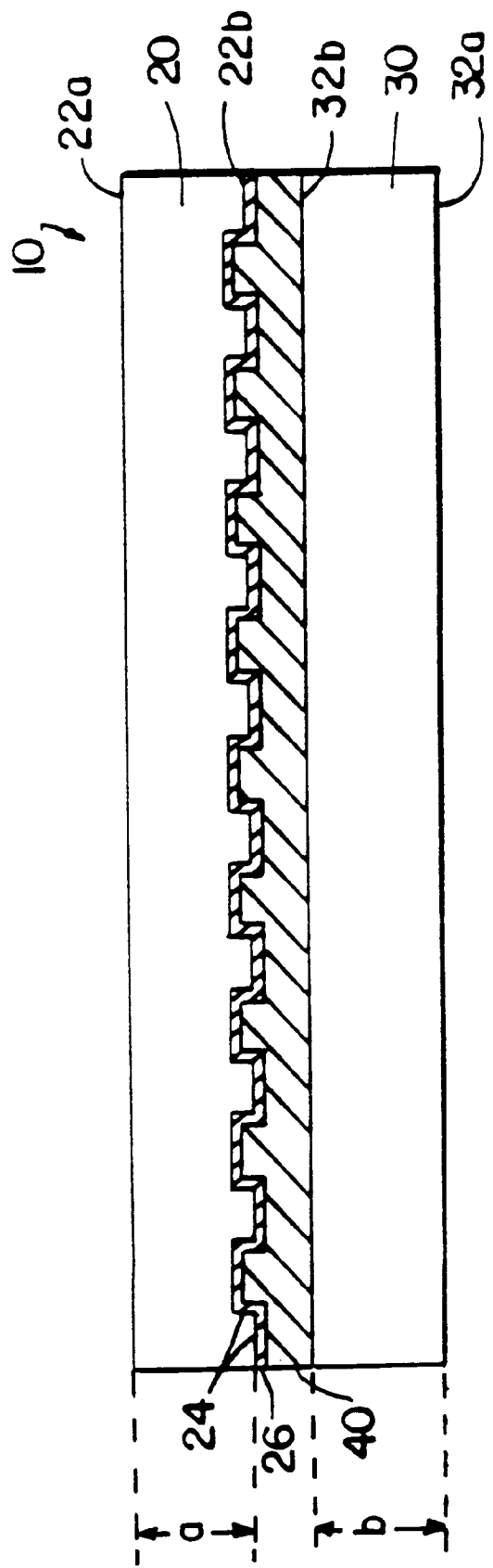
FIG. 1 shows a cross-sectional view of a conventional one-program-information-side information-bearing disc.

FIG. 1 shows a conventional one-program-information-side information-bearing disc 10 comprising a first disc 20 (the front-side disc) adhesively bonded to a second disc 30 (the back-side disc). FIG. 1 illustrates the case in which only one of these two discs (first disc 20) is needed for program information recording. Second disc 30 may be used for artwork, labeling, or left blank.

First disc 20 comprises a substantially smooth first surface 22a and a second surface 22b having program information recorded on it by means of local changes 24 in the distance of the second surface 22b from the first surface 22a. A light-reflecting coating 26 is deposited over second surface 22b.

To form conventional one-program-information-side information-bearing disc 10, second disc 30 is bonded to first disc 20. Second disc 30 comprises substantially smooth third surface 32a and fourth surface 32b and is bonded to first disc 20 with a light-curable bonding material 40 disposed between second surface 22b and fourth surface 32b.

As shown in FIG. 1, first disc 20 and second disc 30 have thicknesses a and b, respectively, which are approximately the same. For example, for a DVD embodiment of information-bearing disc 10, typical values for a and b are approximately 0.6 mm. Thus, the ratio of thickness a/b is approximately 1.

Figure 2:
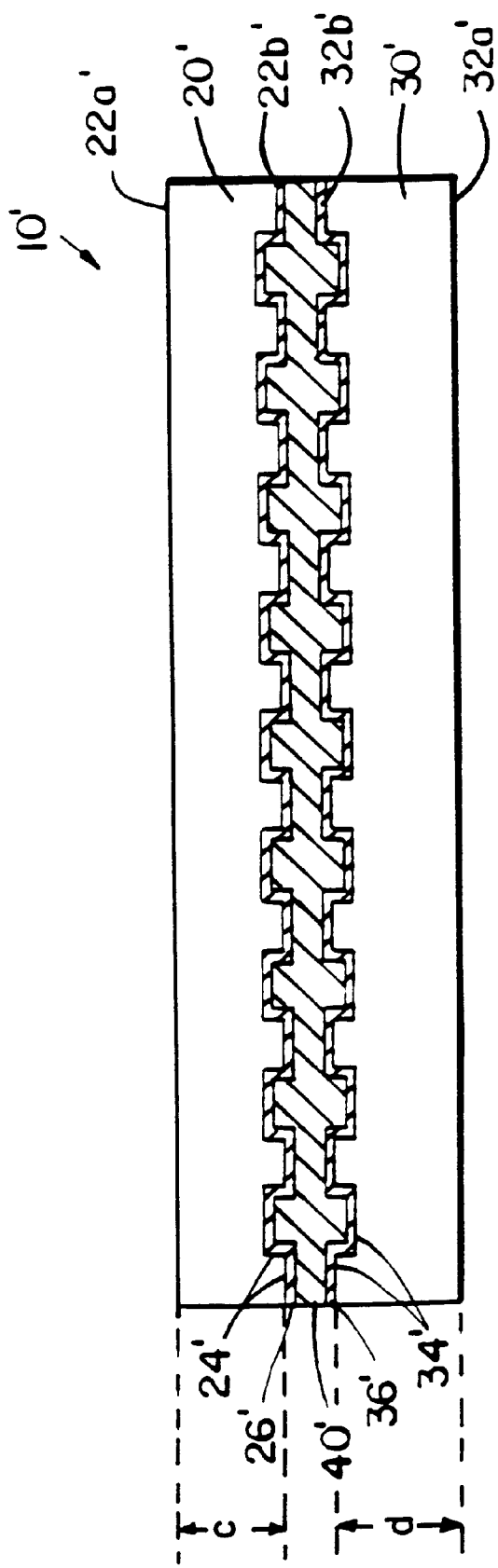
FIG. 2 shows a cross-sectional view of a conventional two-program-information-sides information-bearing disc.

FIG. 2. shows a conventional two-program-information-sides information-bearing disc 10' formed by bonding a first disc 20' (the front-side disc) and a second disc 30' (the back-side disc) to one another back to back. As with first disc 20 of FIG. 1, first disc 20' of FIG. 2 comprises a substantially smooth first surface 22a' and a second surface 22b' having program information recorded on it by means of local changes 24' in the distance of the second surface 22b' from the first surface 22a'. A light-reflecting coating 26' is deposited over second surface 22b'.

To form conventional two-program-information-sides information-bearing disc 10', second disc 30' is bonded to first disc 20', second disc 30' comprising substantially smooth third surface 32a' and fourth surface 32b'. Unlike fourth surface 32b of FIG. 1, fourth surface 32b' of FIG. 2 has program information recorded on it by means of local changes 34' in the distance of fourth surface 32b' from third surface 32a' (as second disc 30' is a program-information-bearing disc). Additionally, a light-reflecting coating 36' is deposited over second surface 32b'.

As shown in FIG. 2, first disc 20' and second disc 30' have thicknesses c and d, respectively, which are approximately the same. For example, for a DVD embodiment of information-bearing disc 10, typical values for c and d are approximately 0.6 mm. Thus, the ratio of thickness c/d is approximately 1.

Figure 3:
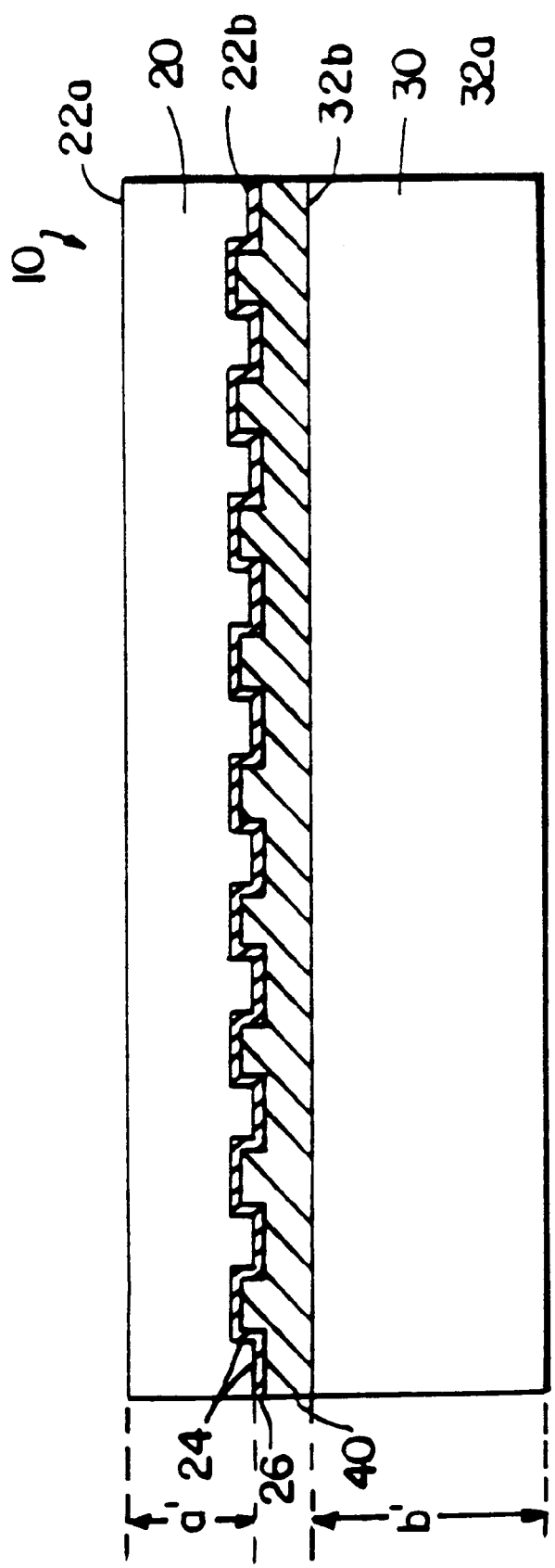
FIG. 3 shows a cross-sectional view of a one-program-information-side information-bearing disc made in accordance with this invention.

As shown in FIG. 3, an illustrative one-information-side information-bearing disc 10 made in accordance with this invention has a first disc 20 (the front-side disc) and a second disc 30 (the back-side disc) bonded to one another back to back. First disc 20 and second disc 30 have thicknesses a' and b', respectively, where b' is slightly larger than a'. For example, for a DVD embodiment of information-bearing disc 10, preferred values for a' and b' are approximately 0.6 mm and 0.7 mm, respectively. Thus, the ratio of thickness a'/b' is less than 1. First and second discs 20 and 30 of FIG. 3 are identical to first and second discs 20 and 30 of FIG. 1 with the exception that the ratio of thickness a'/b' for the embodiment of FIG. 3 is less than the ratio of thickness a/b for the embodiment of FIG. 1.

Figure 4:
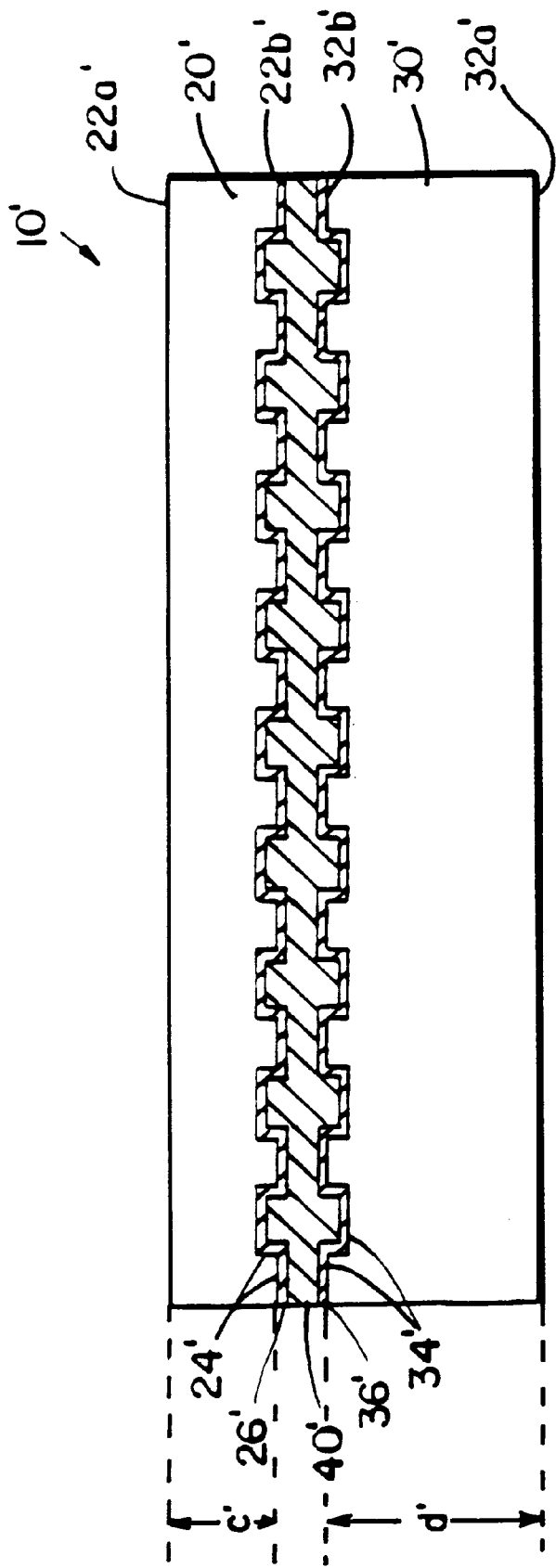
FIG. 4 shows a cross-sectional view of a two-program-information-sides information-bearing disc made in accordance with this invention.

As shown in FIG. 4, an illustrative two-information-sides information-bearing disc 10" made in accordance with this invention has a first disc 20" (the front-side disc) and a second disc 30" (the back-side disc) bonded to one another back to back. As shown in FIG. 4, first disc 20' and second disc 30' have thicknesses c' and d', respectively, where d' is slightly larger than c'. For example, for a DVD embodiment of information-bearing disc 10', preferred values for c' and d' are approximately 0.6 mm and 0.7 mm, respectively. Thus, the ratio of thickness c'/d' is less than 1. First and second discs 20' and 30' are identical to first and second discs 20' and 30' of FIG. 2 with the exception that the ratio of thickness c'/d' for the embodiment of FIG. 4 is less than the ratio of thickness c/d for the embodiment of FIG. 2.

The added thickness of the second disc (the back-side disc) of the embodiments shown in FIGS. 3 and 4 substantially eliminates the rippling and buckling problems often associated with bonding two discs formed on different molding machines.

It will be understood that the foregoing is only illustrative of the principles of this invention, and that various modifications can be made by those skilled in the art without departing from the scope and spirit of the invention. For example, the various dimensions and materials mentioned herein are preferred, but other dimensions and materials can be used if desired.

What is claimed is:

1. An information recording medium comprising:
    a first substantially transparent disc with a thickness of approximately 0.6 mm, said first disc having a first substantially planar surface and a second surface opposite to said first surface, said second surface having first information recorded on it by means of local changes in the distance of said second surface from said first surface; and
    a second disc with a thickness of approximately 0.7 mm, said second disc having opposite, substantially planar, third and fourth surfaces, said second disc being stacked on and secured to said first disc so that said fourth surface faces said second surface.

2. The recording medium defined in claim 1 further comprising:

a first light-reflecting coating on said second surface for reflecting first light passed through said first disc back through said first disc, said first coating conforming to said local changes of said second surface so that said first light is reflected back through said first disc in accordance with the first information recorded by means of said local changes, said first coating having a first coating thickness which allows light-curable bonding material curing through said first coating while maintaining sufficient first coating reflectivity for playability.

3. The recording medium defined in claim 1 wherein said first information comprises program information.

4. The recording medium defined in claim 1 wherein said first information comprises pit art.

5. The recording medium defined in claim 1 wherein said first information comprises enhanced pit art.

6. The recording medium defined in claim 1 wherein said first information comprises holographic artwork.

7. The recording medium defined in claim 1 wherein said first light-reflecting coating comprises aluminum.

8. The recording medium defined in claim 7 further comprising a light-curable bonding material for securing said second disc to said first disc.

9. An information recording medium comprising:

a first substantially transparent disc with a thickness of approximately 0.6 mm, said first disc having a first substantially planar surface and a second surface opposite to said first surface, said second surface having first information recorded on it by means of local changes in the distance of said second surface from said first surface; and a second disc with a thickness of approximately 0.7 mm, said second disc having opposite, substantially planar, third and fourth surfaces, said fourth surface having second information recorded on it by means of local changes in the distance of said fourth surface from said third surface, said second disc being stacked on and secured to said first disc so that said fourth surface faces said second surface.

10. The recording medium defined in claim 9 further comprising:

a first light-reflecting coating on said second surface for reflecting first light passed through said first disc back through said first disc, said first coating conforming to said local changes of said second surface so that said first light is reflected back through said first disc in accordance with the first information recorded by means of said local changes, said first coating having a first coating thickness which allows light-curable bonding material curing through said first coating while maintaining sufficient first coating reflectivity for playability; and a second light-reflecting coating on said fourth surface for reflecting second light passed through said second disc back through said second disc, said second coating conforming to said local changes of said fourth surface so that said second light is reflected back through said second disc in accordance with the second information recorded by means of said local changes, said second disc being stacked on and secured to said first disc so that said fourth surface faces said second surface.

11. The recording medium defined in claim 9 wherein said second light-reflecting coating has a second coating thickness which allows light-curable bonding material curing through said second coating while maintaining sufficient second coating reflectivity for playability.

12. The recording medium defined in claim 9 wherein said first information comprises program information.

13. The recording medium defined in claim 9 wherein said first light-reflecting coating comprises aluminum.

14. The recording medium defined in claim 13 wherein said second light-reflecting coating comprises aluminum.

15. The recording medium defined in claim 14 further comprising a light-curable bonding material for securing said second disc to said first disc.

16. A method of making an information recording medium, said method comprising:

forming a first substantially transparent disc with a thickness of approximately 0.6 mm, said first disc having a first substantially planar surface and a second surface opposite to said first surface, said second surface having first information recorded on it by means of local changes in the distance of said second surface from said first surface;

forming a second disc with a thickness of approximately 0.7 mm, said second disc having opposite, substantially planar, third and fourth surfaces; and securing said second disc to said first disc so that said fourth surface faces said second surface.

17. A method of making an information recording medium, said method comprising:

forming a first substantially transparent disc with a thickness of approximately 0.6 mm, said first disc having a first substantially planar surface and a second surface opposite to said first surface, said second surface having first information recorded on it by means of local changes in the distance of said second surface from said first surface;

forming a second disc with a thickness of approximately 0.7 mm, said second disc having opposite, substantially planar, third and fourth surfaces, said fourth surface having second information recorded on it by means of local changes in the distance of said fourth surface from said third surface; and securing said second disc to said first disc so that said fourth surface faces said second surface.

\* \* \* \* \*